April 15, 1969

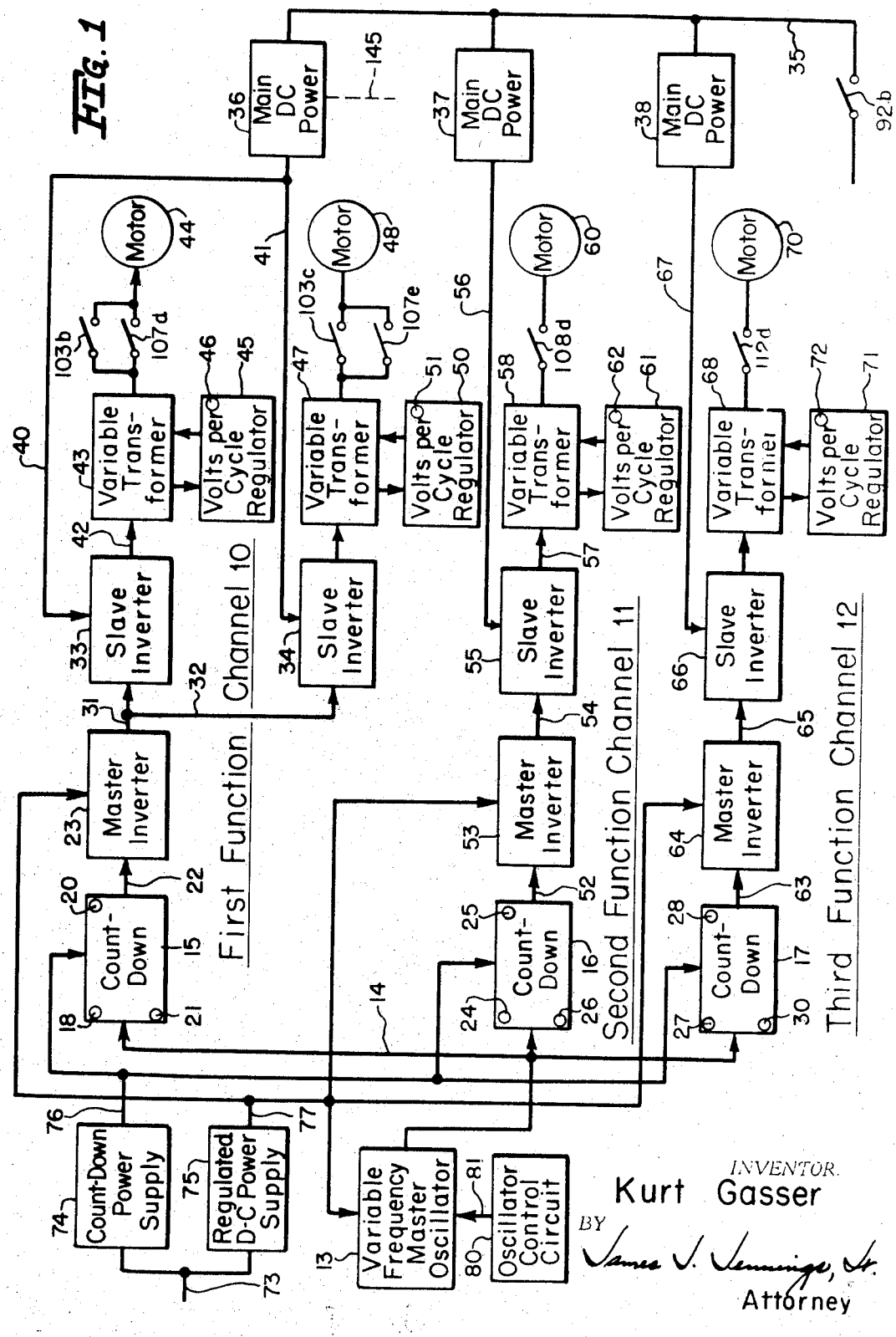

K. GASSER 3,439,242

MOTOR CONTROL SYSTEM WITH FREQUENCY SENSORS FOR DETERMINING
WHEN PREDETERMINED MOTOR SPEED IS ATTAINED

Filed April 8, 1966

INVENTOR.
Kurt Gasser
BY
James J. Jennings, Jr.
Attorney

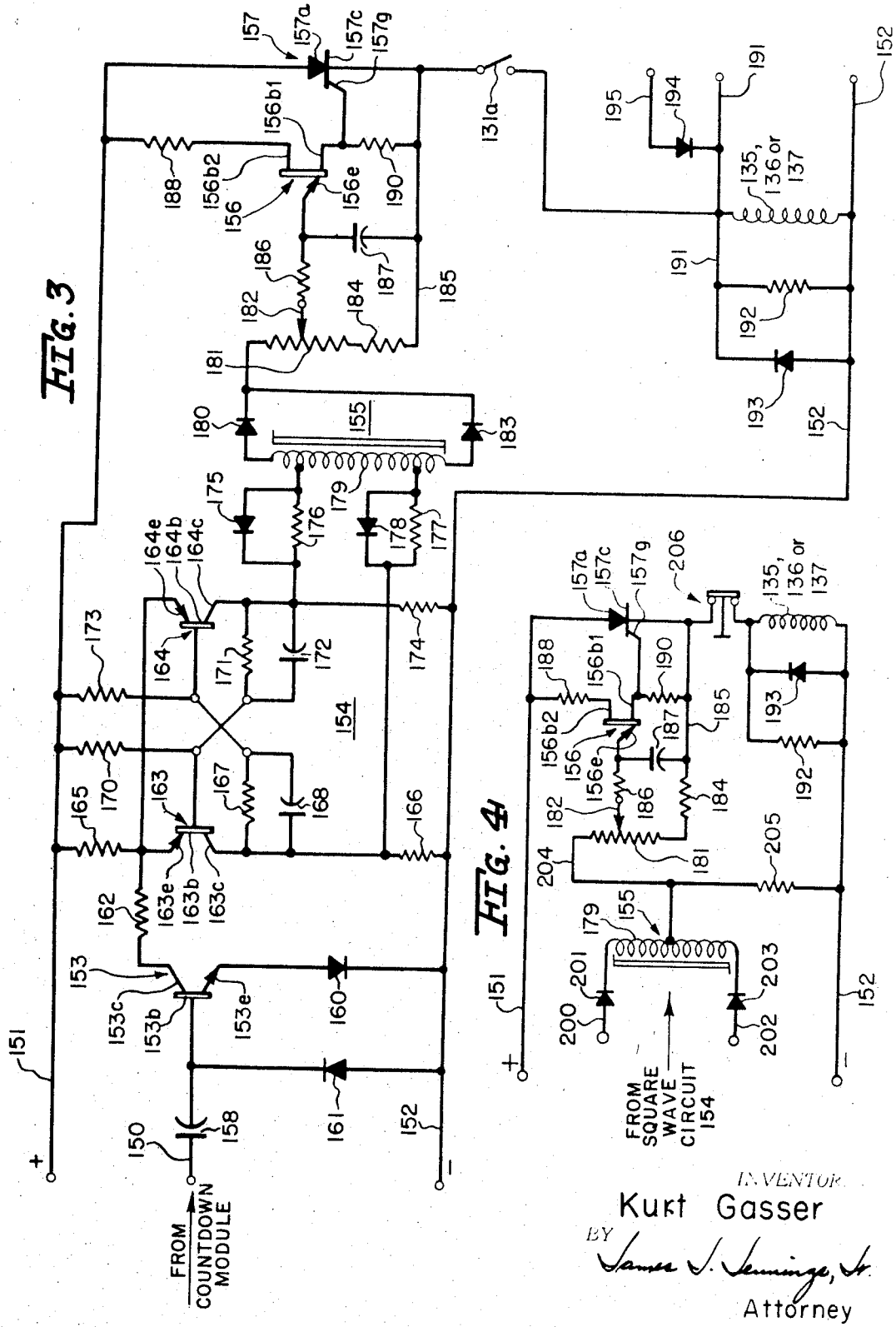

United States Patent Office 3,439,242
Patented Apr. 15, 1969

3,439,242
PLURAL MOTOR CONTROL SYSTEM WITH FREQUENCY SENSORS FOR DETERMINING WHEN PREDETERMINED MOTOR SPEED IS ATTAINED
Kurt Gasser, Orange, Calif., assignor to Borg-Warner Corporation, Chicago, Ill., a corporation of Illinois
Filed Apr. 8, 1966, Ser. No. 541,180
Int. Cl. H02p 5/46, 7/68, 7/80
U.S. Cl. 318—66                                  7 Claims

ABSTRACT OF THE DISCLOSURE

An A-C motor control system includes a plurality of function channels for regulating the speed of the motor in each channel in accordance with the frequency of an inverter output voltage in the same channel. The inverter in each channel is triggered from a countdown unit, and all the countdown units are coupled to a variable frequency master oscillator to provide a timing reference for the entire system. An oscillator control circuit includes a motor for driving the master oscillator circuit and changing the frequency of the basic timing pulses applied to all the countdown units. Each function channel includes a frequency sensor for determining when the pulses passed from the countdown unit to the inverter have reached a certain frequency, thus determining when the motor in that same channel has attained a predetermined speed.

Background of the invention

Figure 2B:
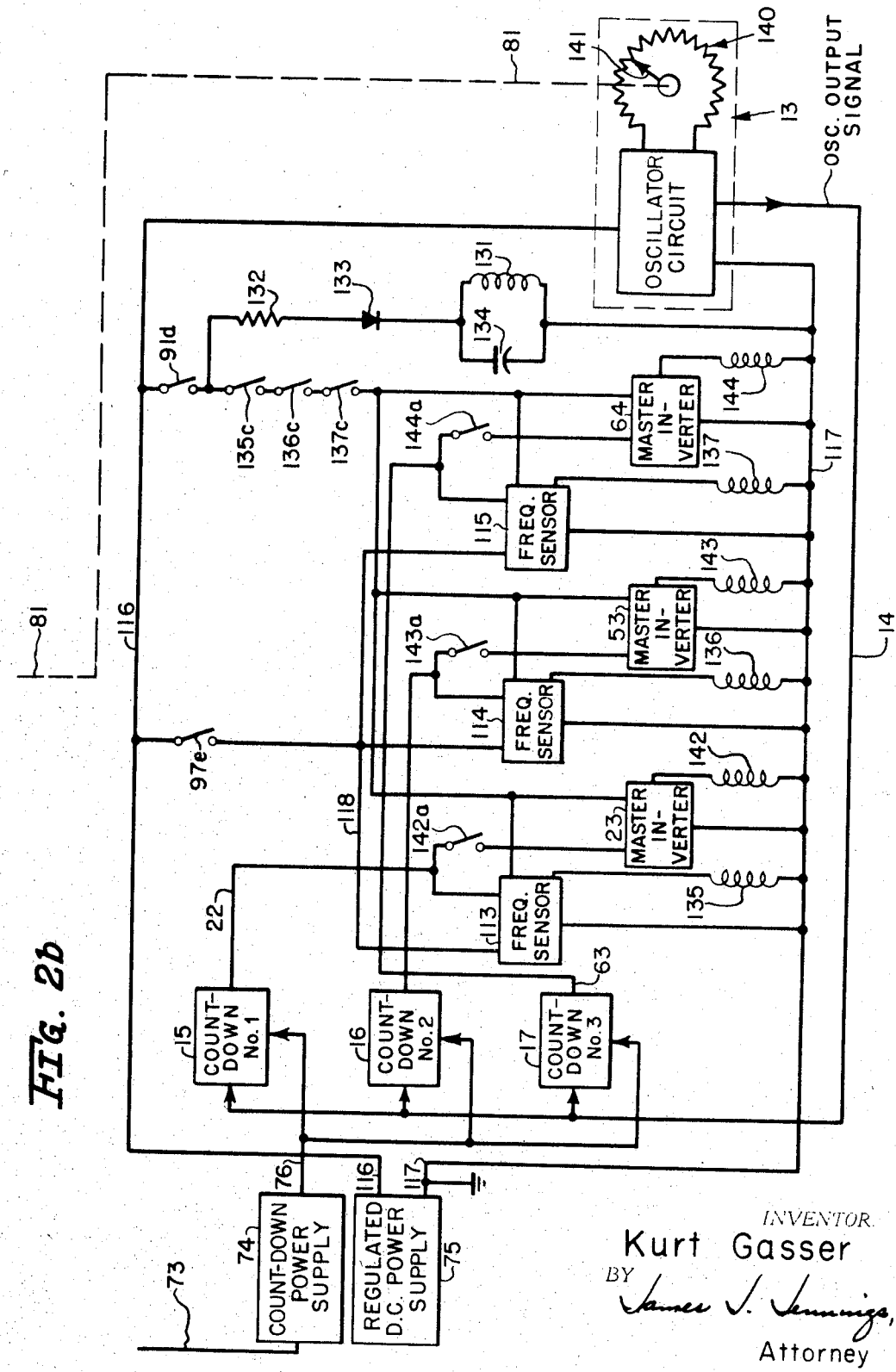

There are many applications for a motor control system in which the speeds of different motors are precisely regulated at different levels. For example, in a textile producing system, a first motor might be regulated at a first speed to govern the rate at which a multiplicity of filaments are drawn off the supply source and twisted into a larger strand, a second motor might operate at a somewhat higher speed to draw the strand through a dye vat for coloring the strand, and a third motor might pull the dyed strand at a slightly higher speed to effect stretching prior to storage of the strand on a take-up reel. When a controlled shrinkage of the material is to be effected, as by passage through a heated space, it is desirable to control the speed of one motor below the speed of the motor at the preceding station. It is important that the various motors be driven from a constant speed reference so that the ratios of the various speeds, and thus the tension or slack (termed "draw") on the material between the operating stations, can be maintained precise and constant.

One system for producing precise regulation of the speed ratios between the various motors employs a countdown module in each "function channel," that is, in each electrical channel which controls one or more motors at a given speed. The countdown module receives a series of timing pulses as an input signal, and produces an output pulse for each predetermined number of received input pulses. Accordingly the reduced-frequency output pulses from the countdown module can be used to regulate the frequency of operation of an inverter which in turn supplies alternating electrical energy to the motor. By providing a single master oscillator for supplying the countdown module in each of the different function channels, and separately adjusting the number of input pulses which must be received in each channel to provide a single output pulse from the countdown module, the various motors can be operated a different speeds and precisely locked together at given speed ratios as referred to the common source of pulses to the countdown units. When such a system is energized, the oscillator immediately produces output pulses at its preset frequency and the system immediately comes up to the operating speeds determined by the settings in the various countdown modules. It would be desirable to provide such a motor control system in which the motors are initially energized to operate at a much lower speed, and thereafter brought up to the system speed by effectively changing the output frequency of the signal supplied by the master oscillator, thus gradually varying the frequency of the pulses supplied from the different countdown modules to correspondingly regulate the frequency of the inverters operating in each different function channel. It is toward the provision of such an unobvious arrangement that the present invention is particularly directed.

Summary of the invention

In a preferred embodiment the present invention includes a variable frequency master oscillator for supplying output pulses to at least one function channel. The output pulses are received in the countdown module which in turn produces output pulses at a reduced frequency to regulate operation of an inverter in that channel. For those systems in which a motor is energized at a constant volts-per-cycle ratio, a variable amplitude transformer may be coupled between the inverter and the motor whose speed is to be regulated, and a volts-per-cycle regulator is coupled to the variable transformer for regulating the level of the energy supplied to the motor in accordance with the frequency of the output energy from the inverter. If additional channels are used, similar arrangements of a countdown module and inverter are coupled between the master oscillator and the motor of the respective channel. Particularly in accordance with the present invention, an oscillator control circuit is provided and coupled to the variable frequency master oscillator to regulate energization of the master oscillator to produce output pulses at a first frequency when the system is initially energized, and to gradually raise the output pulse frequency from the master oscillator toward the second frequency or system operating frequency, and thereafter provide operation of all channels at the desired system speeds. A frequency sensor is coupled in each channel to recognize when the second frequency or system operating frequency is attained, which frequency corresponds to the predetermined speed of the motor coupled in that channel.

The drawings

To enable those skilled in the art to make and use the invention, the best mode contemplated for carrying out the invention will be described in connection with the accompanying drawings, in the several figures of which like reference numerals identify like elements, and in which:

FIGURE 1 is a block diagram illustrating a motor control system including the present invention;

FIGURES 2a and 2b together comprise a schematic diagram, partly in block form, particularly illustrating a control arrangement for the present invention; and FIGURES 3 and 4 are schematic diagrams of circuits useful in conjunction with this invention.

General system description

FIGURE 1 depicts a general circuit layout including first, second and third function channels 10, 11 and 12, respectively. Fewer or a greater number of channels may be provided, or a single function channel can be connected and operated as taught subsequently within the scope of the inventive principles. A variable frequency master oscillator 13 is provided and connected so that upon its energization the output signals from oscillator 13 are transferred over common conductor 14 to the input circuits of each of countdown modules 15, 16, and 17, respectively disposed in the first, second, and third function channels. Countdown module 15 includes a first knob or switch 18 operable to adjust the setting of a portion of the module circuitry for providing an output pulse for a given number of input pulses, and likewise knob 20 represents adjusting means for setting a different circuit within the same countdown module to provide an output pulse for any number of input pulses. A selector switch 21 is also provided to determine which of the interior circuits, the circuit regulated by knob 18 or that circuit controlled by switch 20, is operative at a given time to pass the output pulses from the countdown module over conductor 22 to master inverter 23 as a given number of timing pulses are received over conductor 14. Countdown module 16 in the second channel 11 likewise comprises first and second frequency-adjusting circuits 24 and 25, together with a selector switch 26 to regulate which of the frequency-determining circuits is operative; countdown module 17 in the third channel 12 similarly include frequency-adjusting knobs 27 and 28, together with a selector switch 30. Such countdown modules are now well known and understood in this art. By way of example an effective circuit arrangement for use in such a module is disclosed and claimed in the copending application of Everett R. Geis, entitled "Control System," filed Nov. 25, 1963, having Ser. No. 325,816, which issued Oct. 11, 1966, as Patent No. 3,278,727, and which is assigned to the assignee of this invention. No further explanation will be given herein of the countdown module itself.

The output energy from master inverter 23 is passed over conductors 31 and 32 to slave inverters 33 and 34. Each master inverter may include an input or logic circuit for distributing the pulses received from the countdown module and effecting the sequential energization of six separate semiconductor switches, in a manner now well known in this art. A typical arrangement which may be ultilized is disclosed and claimed in the issued Patent No. 3,091,729, of Edward M. Schmidt, entitled "State Inverter," which issued on May 28, 1963, and is assigned to the assignee of this invention. The frequency-dividing portion for receiving the timing pulses in shown as logic circuit 12 in FIGURE 1 of that patent, and includes stages 21–26 shown in FIGURE 2 thereof. The SCR's and the various switching circuits 13–18 inclusive are utilized for providing the alternating output energy which alternates at a frequency determined by the setting of the countdown module.

Slave inverter 33 may comprise semiconductor switches such as silicon-controlled rectifiers which are gated on by the signals provided by the master inverter 23 so that the output frequency of slave inverter 33 is exactly the same as that of master inverter 23. The A-C energy provided by slave inverter 33 on conductor 42 may be at a considerably higher level than the energy received from the master inverter, in that as switch 92b is closed to provide high level A-C energy over conductor 35 to the main D-C power supplies 36, 37 and 38, the high level D-C energy from main D-C power supply 36 is passed over conductors 40, 41 to the slave inverters 33 and 34, respectively. The energy of slave inverter 33 is passed over conductor 42 to variable transformer 43, the output side of which is coupled through switches 103b and 107d to motor 44. The variable transformer may have an adjustable tap (or taps) and a drive motor, controlled by a signal from a volts-per-cycle regulator 45, for regulating the level of the A-C energy passed to motor 44. The volts-per-cycle regulator 45 operates to sense both the voltage level and the frequency of the energy passed over the variable transformer 43 from slave inverter 33, and adjusts the level of the voltage transferred over the variable transformer to the motor 44 in accordance with a volts-per-cycle ratio previously set by adjustment of control knob 46 on volts-per-cycle regulator 45. The arrangement, including the circuitry of the volts-per-cycle regulator and its appropriate connections to the adjusting motor for regulating the voltage output of the variable transformer, is disclosed and claimed in the copending application of Jay R. Borden, Kurt Gasser and Stanley Krauthamer, entitled, "Control System," having Ser. No. 374,065, filed June 10, 1964, which issued Nov. 7, 1967, as Patent No. 3,351,835, and is assigned to the assignee of this invention.

In the first function channel 10, each of slave inverters 33 and 34 is controlled in accordance with the frequency of the output energy from master inverter 23. A second variable transformer 47 is provided, and is coupled over switches 103c and 107e to motor 48. A second volts-per-cycle regulator 50 having a preset ratio adjustment means 51 is also provided and is coupled to variable transformer 47 to regulate the level of the energy supplied to motor 48 in accordance with the ratio preset by adjustment of switch 51.

In the second function channel 11, countdown module 16 is coupled over conductor 52 to master inverter 53, which in turn supplies output pulses over conductor 54 to regulate the frequency of operation of slave inverter 55. Main D-C power supply 37 passes high level D-C energy over conductor 56 to energize slave inverter 55 which in turn passes its output energy over conductor 57 to variable transformer 58, the output circuit of which is coupled over switch 108d to motor 60 in the second channel. A volts-per-cycle regulator 61, which includes a preset ratio adjustment means 62, is coupled to the variable transformer 58 in a manner apparent from the previous explanations.

In third function channel 12, the output side of countdown module 17 is coupled over conductor 63 to master inverter 64, in its turn coupled over conductor 65 to slave inverter 66 which is energized over conductor 67 from main D-C power supply 38. The output side of slave inverter 66 is coupled over variable transformer 68 and switch 112d to motor 70, to regulate the speed of this motor. Another volts-per-cycle regulator 71 is provided, and this regulator also includes a switch or rotatable knob 72 to preset the desired volts-per-cycle ratio of the energy passes to motor 70.

Energy from a conventional alternating-current power main is provided over conductor 73 and applied to the input side of both countdown power supply 74 and regulated D-C power supply 75. The output side of countdown power supply 74 is coupled over conductor 76 to supply suitable D-C energy to each of the countdown modules 15, 16, and 17. This energy is precisely regulated to ensure accurate operation of the frequency-determining components in the overall system. A similar regulation is provided within power supply 75, which passes its output energy over conductor 77 to each of the master inverters, 23, 53 and 64, and likewise to the variable frequency master oscillator 13.

In accordance with the present invention, an oscillator control circuit 80 is provided and is coupled over conductor 81 to variable frequency master oscillator circuit 13. As will become apparent, the oscillator control circuit may comprise a motor mechanically coupled to a frequency-determining component, such as a potentiometer, within oscillator circuit 13 so that at any desired time in system operation, operation of the oscillator control circuit will control the frequency of the output signals from oscillator 13, correspondingly varying the frequency of the signals at the output side of each of countdown modules 15–17 to effect a corresponding speed regulation of each of the motors in the different function channels. With this initial perspective of the general system, the energization and control of the various components will now be described in detail.

*Control of system energization and operation*

In the upper left-hand portion of FIGURE 2a, a switch 85 is shown for transferring input energy received over conductors 86, 87 to conductors 88, 87 after switch 85 is closed. These and other components which operate on alternating energy were utilized in the control circuit of the invention and so ordinary 60 cycle, 110–120 volts energy may be supplied over input conductors 86, 87. Similarly A-C energy may be supplied over the conductors represented generally by a single conductor 73 in FIGURE 1 but it is possible, in that many related contactors are shown in FIGURES 2a and 2b, to utilize separate transformers for isolation for widely separated input connections to supply the 60 cycle energy to the countdown power supply 74, regulated power supply 75, and to the switching circuitry shown in FIGURES 2a and 2b. A start button 90 is provided and is effective in its operation to energize start relays 91, 92 and 93. Stop button 94 includes a first contact portion 95 for interrupting the start circuit and a second portion 96 for closing an energizing circuit for the stop relay 97. After initial energization of the system, input A-C energy is supplied over conductors 98, 87 in a manner to be described hereinafter for energization of a run relay having a winding 100 after the oscillator motor 80 has been energized to drive the system from an initial low frequency operation up to the desired system speed.

Also shown in FIGURE 2a is a jog button 102 for energizing jog relay winding 103 and its associated windings 104, 105. Function No. 1 button 106 is provided to effect energization of function 1 relay winding 107 and the previously described relays 104, 105. Likewise function 2 control button 110, and a similar switch or button 111 completes the circuit for the relay winding 112 in the third function channel. Other components such as the volts-per-cycle regulators 45, 50, 61 and 71 have been described in connection with FIGURE 1.

Certain of the components of FIGURE 2b have been shown in FIGURE 1. Considering the three frequency sensor units 113, 114 and 115, as will become apparent hereinafter from an explanation in connection with the showing of FIGURE 3, each of these units initially senses the frequency of the output signals from the respective countdown modules 15–17 and, when all of these signals have reached a predetermined minimum value, sensor units 113–115 effect control operations which collectively disable the oscillator motor 80 and apply energy to the respective master inverters of the different function channels.

Considering now the detailed preparations for energizing the circuitry of FIGURES 2a and 2b, before any of the equipment is energized the respective dials on the countdown modules 15–17 are adjusted and the selector switches 21, 26 and 30 are manipulated to select the desired running speeds of motors 44, 48, 60 and 70. After the settings have been made, energy from a conventional A-C source is supplied over line 73 to the countdown power supply 74 and the regulated D-C power supply 75, which is effective to provide unidirectional energy over conductors 116, 117 to the various components. It is noted that immediately upon energization of power supply 75, energy is applied over conductors 116, 117 to the variable frequency master oscillator 13, which has previously been placed in the position to provide the lowest frequency output signal responsive to this initial energization. Likewise energy is passed from conductor 116 over contact set 97e to conductor 118, to energize each of frequency sensors 113–115. The countdown modules 15–17 are energized from power supply 74. Switch 85 (FIGURE 2a) is closed and input energy is thus provided on conductors 88, 87. The system is now in the "thread-up" condition and is ready to be started, with oscillator 13 now operating at the lowest frequency.

To start the system, start button 90 is pushed to complete an energizing circuit for winding 91 of the start relay. This circuit extends from conductor 88 over contact set 95 of the stop button 94, the contacts of start switch 90, limit switch 120 (this single switch represents four such switches, each of which is closed when its associated variable transformer is in the minimum voltage position), low limit switch 124 which is closed as indicated when oscillator 13 is providing an output signal at the lowest frequency, normally closed contacts 146 which are not opened until the oscillator reaches its highest frequency, normally closed contacts 97b, normally closed contact set 125 (which actually represents four such contact sets, respectively associated with the four slave inverters and connected to open when an excess current flows in any inverter), normally closed contact set 104a, and winding 91 of the start relay to conductor 87.

Accordingly relay winding 91 operates and at its contact set 91a completes an energizing circuit for the winding 92 of the second start relay; at its contact set 91b completes an energizing circuit for winding 93 of the third start relay and for its associated pilot light 130; at its contacts 91c interrupts a portion of the reverse drive circuit for oscillator motor 80; and at its contacts 91d completes an energizing circuit for winding 131 (FIGURE 2b), which circuit extends from conductor 116 over contacts 91d, resistor 132, diode 133 and the parallel-connected combination of winding 131 and capacitor 134 to conductor 117.

Relay 92 operates and at its contact set 92a completes a portion of the holding circuit for winding 91, which portion bypasses start button 90 and limit switches 120 and 124; and at its contacts 92b (FIGURE 1) completes an energizing input circuit which passes the high level alternating energy over line 35 to the main D-C power supplies 36, 37 and 38. Accordingly at this time the main D-C power supplies 36–38 are operative to produce the high level D-C energy and apply it over respective conductors 40, 41, 56 and 67 to the slave inverters in the different function channels. However, the motors are still not operating in that no signal is present from the master inverters to the respective slave inverters.

Relay 93 operates and at its contact set 93a completes the forward drive circuit for oscillator motor 80, which circuit extends from conductor 88 over contact set 93a, the three parallel-connected contact sets 135b, 136a and 137a, limit switch 138 (which does not open until the oscillator motor has driven the oscillator output signal to the second or high frequency), contact set 97d, and the forward winding of oscillator motor 80 to conductor 87. Thus the input energy from conductors 86 and 87 is now present on conductors 98, 87 to energize their respective function control units as they are independently operated, and the oscillator motor 80 is driving the oscillator from the low or start frequency toward the high frequency.

The driving in the forward direction of oscillator motor 80 is transferred by a mechanical linkage, represented by broken line 81, to potentiometer unit 140 (FIGURE 2b) of variable frequency oscillator 13. More specifically, the energization of the oscillator motor 80 drives the movable arm 141 of this potentiometer to correspondingly change the frequency of the output signal passed from oscillator 13 over conductor 14 to the input side of each of countdown units 15, 16 and 17. The output signal from countdown unit 15 is supplied over conductor 22 to the frequency sensing input connection of the first frequency sensor 113, previously energized from conductor 116 over contact set 97e, conductor 118 and sensor 113 to conductor 117. This signal from countdown unit 15 is not applied to master inverter 23 at this time, in that the master inverter is itself not energized and thus the relay including winding 142 is deenergized, allowing contact set 142a to remain open. Likewise neither of the other master inverters 53 and 64 are operating; relay winding 143 is deenergized and contact set 143a is open, and relay winding 144 is deenergized and contact set 144a is open. The signals from the other countdown units 16 and 17 are applied to the respective frequency sensors 114 and 115 in like manner.

For purposes of explanation it is assumed that each of frequency sensor units 113–115 is preset to operate its associated relay (135, 136 and 137) when a specific minimum frequency is reached, for example, of the order of 10 cycles per second. This may be considered the low or starting frequency of the system as compared to a normal operating frequency in the range of 150 cycles per second. It is further assumed that at the system running speed, motors 44 and 48 at function 1 are operating at a given speed, motor 60 at function 2 is operating at a slightly higher speed, and motor 70 at function 3 is running slightly faster than motor 60. Accordingly the output signal from countdown unit 17 is the first to reach the preset value (10 c.p.s.) and applies the low or start frequency signal over conductor 63 to frequency sensor 115, which recognizes that this low frequency level has been reached and energizes associated relay winding 137. Relay 137 operates and its contact set 137a (FIGURE 2a) interrupts a portion of the energizing circuit for the forward winding of oscillator motor 80 (which circuit is still completed over contact sets 135b and 136a); at its contact set 137b completes a portion of the function three start circuit; and at its contact set 137c completes a portion of the energizing circuit for the three master inverters 23, 53 and 64.

The lower or start frequency is next sensed by frequency sensor 114, which energizes its associated relay winding 136. In its operation relay 136 opens its associated contact set 136a, interrupting another portion of the forward drive circuit for oscillator motor 80 (which is still driven over contact set 135b); at its contact set 136b completes a portion of the energizing circuit for the function 2 channel; and at its contact set 136c completes another part of the energizing circuit for the three master inverters.

Frequency sensor 113 next senses that the minimum or low frequency has been reached and the first function channel then operates its associated relay 135. In its operation relay 135 closes contact set 135a, connected in series with stop winding 91; at its contact set 135b interrupts the last portion of the forward drive circuit of oscillator motor 80, which motor is thus halted at this time; and at its contact set 135c completes the energizing circuit for the three master inverters. With the application of unidirectional energy from conductor 116 over contact sets 91d, 135c, 136c and 137c, to each of the three master inverters 23, 53 and 64, these inverters are effective to operate their associated delays 142, 143 and 144. In their operation these relays close their respective contact sets 142a, 143a and 144a, thus completing the signal input paths from the different countdown units to the respective master inverters. Accordingly at this time the signal path from the variable frequency master oscillator 13 is completed through the countdown units to the master inverters, for in turn controlling the frequency of operation of their respective slave inverters. However, with the interruption of the forward drive circuit for oscillator motor 80, the system is still operating at a low or start frequency and is not yet up to system speed.

Before the system is driven up to its desired operating speed it is sometimes useful to "jog" or momentarily energize one or another function to provide very short duration energization for their associated motors. Such operation is useful in thread-up or stringing of a plurality of filaments to the location at which they are wound into a strand, and for related arrangements in which material must be displaced from one or more haul-off drums to the first operating station of a system. To effect this jogging action, button 102 is closed to complete an obvious energizing circuit for relay winding 103, which operates. In its operation relay 103 at its contacts 103a completes an energizing circuit for relay windings 104 and 105; at its contact set 103b completes a circuit (FIGURE 1) for transferring energy from variable transformer 43 to motor 44; and its contacts 103c likewise effects transfer between transformer 47 and motor 48.

Relay 104 operates and at its contact set 104a interrupts a portion of the start circuit, which contact opening is not effective by reason of the now-closed contact set 135a. The other contact set 104b is not closed until after a predetermined time delay of a few seconds, precluding the transfer of energy from conductor 98 to the volts-per-cycle regulators 45 and 50 in the first function channel during this time delay to avoid hunting or unnecessary frequent changes in the settings of the variable transformers 43 and 47 during the time that the system is being readied for operation. In general the jogging operation is accomplished in a time less than that required to close contact set 104b.

Relay 105 operates and, as represented generally by the contact set 145, is effective to increase the output voltage from the main D-C power supply 36 (FIGURE 1) to the slave inverters as the system is initially energized at the low frequency. Those skilled in the art will appreciate that initially a lower voltage is applied to each of the slave inverters before the system is driven up to the operating speed, and therefore a more detailed explanation of the circuit connected to winding 105 is not deemed necessary to a full understanding of the invention.

Assuming now that it is desired to energize each of the function channels in bringing the system up to complete operating speed, the "function 1 on" switch 106 is first closed to complete an energizing circuit for winding 107. Relay 107 operates and its contact set 107a completes the holding circuit for this relay; at its contact set 107b completes an energizing circuit for relay windings 104 and 105; at its contact set 107c completes a portion of the energizing circuit for run relay winding 100; at its contact set 107d (FIGURE 1) completes a circuit for transferring energy between variable transformer 43 and motor 44; and in a like manner, at its contact set 107e completes a similar energizing circuit between variable transformer 47 and motor 48. Relays 104 and 105 also operate and actuate their contact sets as previously described in connection with the operation of jog switch 102.

To initiate function 2 operation, "function 2 on" button 110 is closed to complete an energizing circuit for relay winding 108; contact set 136b was previously closed upon the operation of relay 136 by frequency sensor 114. Relay 108 operates and at its contact set 108a completes its holding circuit; at its contact set 108b prepares another part of the energizing circuit for run relay winding 100; at its contact set 108c completes a circuit for applying the high level D-C energy from the main D-C power supply 37 to the slave inverter 55; and at its contact set 108d completes an energy transfer circuit between variable transformer 58 and motor 60.

In like manner the third function channel is energized by closing "function 3 on" button 111 to complete an energizing circuit for relay winding 112. Relay 112 operates and its contact set 112a completes the holding circuit for this relay; at its contact set 112b completes the last portion of the energizing circuit (except for still-open run button 101) for run winding 100; at its contact set 112c completes a circuit within main D-C power supply 38 for transferring the high level D-C energy over conductor 67 to slave inverter 66; and at its contact set 112d completes an energy transfer circuit between the variable transformer 68 and motor 70. Accordingly all of the functions are now operating at the low frequency as determined by operation of the three frequency sensors 113, 114 and 115 which collectively function to interrupt energization of the forward drive circuit for oscillator motor 80. All of the motors are thus being driven at the low or starting frequency, and the operating circuits for run relay 100 and for the forward drive winding of oscillator motor 80 are still interrupted.

To bring the system up to the desired operating speed, the run switch or button 101 is depressed to complete the previously prepared energizing circuit for run winding 100. Relay 100 operates and at its contact set 100a completes its holding circuit; at its contact set 100b completes an energizing circuit for the forward winding of oscillator motor 80; and at its contact set 100c completes a circuit which bypasses limit switch 146, which will be opened when the system comes up to the desired speed and the oscillator is operating at its high frequency. The oscillator motor commences to drive the movable arm 141 of potentiometer 140 to bring the frequency of the oscillator output signal up to a value corresponding to the desired system speed. When this value is reached, as indicated by the physical location of arm 141, limit switch 138 is opened to interrupt the forward drive circuit of oscillator motor 80 and disable this motor; likewise limit switch 146 is opened. In that function 1 has been operating with relay 104 energized (over contacts 107b) for more than the required time delay, contact set 104b has been closed and volts-per-cycle regulators 45 and 50, as well as the other regulators 61 and 71 in the second and third channels, are all operating. Thus the entire system is now operating at the preset speed with the different motors in the different channels being operated at their respective frequencies as determined by the settings of the frequency control knobs and selector switches in each of the countdown modules 15, 16 and 17.

When it is desired to stop the motors, the stop switch 94 is actuated, operating contact sets 95, 96. Contact set 95 is opened to interrupt the start circuit for relay winding 91, to effect an obvious deenergization of the related relay windings 92 and 93. Thus relay 92 drops out immediately to open contact set 92b and remove the energization of the main DC power supply units 36, 37 and 38. However, except for contact set 91a, the other contacts of these relays remain energized for a period of approximately five seconds to allow the system to bleed off the power from the high voltage D-C bus on each main power supply after the input power has been removed from units 36–38.

With the actuation of stop switch 94, contact set 96 is closed to complete an energizing circuit for relay 97 over limit switch 147. This limit switch is closed whenever the arm 141 of potentiometer 140 is in any position other than its minimum or start position. Accordingly the limit switch is closed when the stop command is given by actuation of stop switch 94.

Relay 97 operates and its contact set 97a completes a holding circuit around contact set 96; at its contact set 97b interrupts the start circuit to insure there can be no actuation of the start circuit during the shut-off interval; at its contacts 97c completes the reverse drive circuit for oscillator motor 80; at its contact set 97d interrupts the forward drive circuit for the same motor; and at its contact set 97e interrupts the energization circuit for the three frequency sensors 113–115. Thus the reverse drive circuit of oscillator motor 80 is now completed from conductor 88 over contact sets 97a, 147, 91c, 97c and the reverse winding to conductor 87. The motor continues to drive movable arm 141 of potentiometer 140 and reduce the frequency of the output signal from oscillator 13 until the minimum or start frequency is reached, and at this time the physical position of arm 141 is signalled by opening of limit switch 147 to interrupt the reverse drive circuit for motor 80. Likewise relays (not shown) in the volts-per-cycle regulators are connected in a manner apparent to those skilled in the art to drive the adjusting motors of the variable transformers and return each transformer to the minimum-voltage position, effecting the closure of the limit switches represented by switch 120 in the start circuit to prepare for energization of the system upon the next actuation of start button 90. As the oscillator is returned to its minimum or start frequency position, limit switch 124 is likewise closed to prepare the other portion of the start circuit. The system is now ready for restarting upon another actuation of start button 90.

Having considered in detail the arrangement, energization, and control of the inventive system, and subsequent deenergization of the system, a typical frequency sensor arrangement such as may be utilized as one of the units 113–115 will now be described.

*Frequency sensor for signal of increasing frequency*

FIGURE 3 depicts a single frequency sensor suitable for use as one of the sensors just described. As shown the sensor includes an input conductor 150 for receiving pulses from one of the countdown modules, and a pair of energizing conductors 151 and 152. Incoming pulses are amplified in a first transistor 153, and the pulses are converted into a square wave signal in flip-flop circuit 154. The volt-second integral of the square wave signal is developed across inductor 155. The volt-second integral signal is utilized to trigger a unijunction transistor 156 and gate on an associated SCR 157 to operate one of the relay windings 135–137 which are energized when the frequency sensor indicates the preset frequency.

In more detail, input conductor 150 is coupled over a capacitor 158 to base 153b of an NPN-type transistor 153, of which the emitter 153e is coupled through bias diode 160 to conductor 152. A protective diode 161 is coupled between base 153b and conductor 152. The collector 153c is coupled over a resistor 162 to the emitters 163e and 164e of transistors 163 and 164, respectively. These emitters are coupled together and also coupled over resistor 165 to conductor 151. The collector 163c is coupled over resistor 166 to conductor 152, and over resistor 167 to base 164b of transistor 164. A capacitor 168 is coupled in parallel with resistor 167. Base 163b is coupled over a resistor 170 to conductor 151, and over another resistor 171 to collector 164c. A capacitor 172 is parallel-connected with resistor 171. Base 164b is coupled over resistor 173 to conductor 151, and collector 164c is coupled over resistor 174 to conductor 152.

A resistor 175, shunted by diode 176, is coupled between a tap on winding 179 of inductor 155 and the common connection between collector 164c and resistor 174. Another resistor 177, shunted by protective diode 178, is coupled between another tap on winding 179 and the common connection between collector 163c and resistor 166. The upper end of winding 179 is coupled over a diode 180 to the upper end of a potentiometer 181 which has a movable arm or tap 182. Another diode 183 is coupled between the other end of winding 179 and the connection between diode 180 and potentiometer 181. A resistor 184 is coupled between the lower end of potentiometer 181 and conductor 185. Another resistor 186 is coupled between arm 182 of the potentiometer and the emitter 156e of unijunction transistor 156. Filter capacitor 187 is coupled between conductor 185 and the common connection of resistor 186 and emitter 156e.

The upper base 156b2 is coupled over a resistor 188 to conductor 151, and lower base 156b1 is coupled over another resistor 190 to conductor 185. Gate element 157g of SCR 157 is coupled to the common connection between resistor 190 and base 156b1. Anode 157a is coupled to conductor 151, and cathode 157c is coupled over contact set 131a to conductor 191. A resistor 192 is coupled in parallel with winding 135 (using the notation for frequency sensor 113 and its associated relay) and a protective diode 193 is also coupled in parallel with this same winding. Diode 194 is coupled between conductor 191 and input conductor 195.

In operation, positive-going pulses are received from the respective countdown module over capacitor 158 and amplified and inverted in transistor 153, to provide a negative-going signal at the common connection of resistors 162 and 165, which signal is applied to emitters 163e and 164e. Assuming that the transistor 164 is initially conducting, there is no instantaneous change in the state of this transistor as the negative-going signal is applied to its emitter. However, the application of the negative-going signal to emitter 163e is effective to forward-bias the base-emitter circuit of this transistor and rapidly gate it on. As transistor 163 conducts, the voltage at the point between resistor 166 and capacitor 168 rapidly goes positive, thus applying a positive-going signal to base 164b of the other transistor 164 and reverse-biasing the base-emitter circuit of transistor 164. Accordingly, transistor 164 is rapidly turned off. A similar action occurs upon receipt of the next pulse, and thus it is apparent that circuit 154 is essentially a wave-shaping circuit for producing generally square-wave signals at a frequency determined by the rate of the signals supplied over input conductor 150.

The square wave signals developed across collector resistors 166, 174 are applied over resistors 175, 177 to winding 179 of inductor 155, which has a square saturation characteristic. When inductor 155 is saturated, resistors 175 and 177 limit the level of current flow through the inductor. Thus, this component essentially responds to the volt-second integral of the energy supplied from the wave shaping circuit. A unidirectional signal is provided by diodes 180, 183 and this signal appears across potentiometer 181 and resistor 184. As the frequency of the square wave signal is increased the level of the voltage across the combination of potentiometer 181 and resistor 184 gradually increases. A portion of this voltage is applied from arm 182 over resistor 186 to emitter 156e of transistor 156. Capacitor 187 cooperates with resistor 186 to smooth the potential applied to emitter 156e. When this potential reaches the level required to trigger unijunction transistor 156, this transistor conducts to provide a signal across resistor 190 which gates on semiconductor switch 157.

In that contact set 131a previously was closed when relay 131 was operated in response to energization of relay 91 in the start circuit, conduction of SCR 157 is effective to complete the energizing circuit for the particular one of windings 135–137 which is connected between conductors 191 and 152. This relay is then operated to actuate its associated contact sets as explained above in connection with FIGURES 2a and 2b. A separate holding signal can be applied from the D-C supply over conductor 195 and diode 194 to maintain the relay energized after the SCR has been gated on. Such a latching arrangement is not requisite in that the semiconductor switch 157 is normally maintained conductive until the system is again deenergized. However, should a large transient be applied over conductors 151, 152 and inadvertently switch off SCR 157, the latching signal maintained on conductor 195 will keep relay 135 energized notwithstanding the switching off of SCR 157.

*Frequency sensor for signal of decreasing frequency*

It may be desirable in some instances to provide variation of the system operating frequency between first and second frequencies by sensing a decreasing output frequency from the countdown modules as the system is deenergized. For example, the sensors 113–115 (FIGURE 2b) could be utilized to sense the signal of decreasing frequency as oscillator motor 80 drives the potentiometer arm 141 when the stop switch is actuated. In this way the complete system could be driven down to the 10 c.p.s. frequency, or some other nominal starting frequency, rather than being driven all the way to zero and requiring an initial displacement to the nominal starting frequency when the system is restarted. However the sensors 113–115 must then be arranged to energize their associated relay windings 135–137 in response to a signal of decreasing frequency, and it is this arrangement which is illustrated in FIGURE 4.

As there shown, the square wave signal of the type produced by the circuit 154 in FIGURE 3 is applied over conductors 200 and 202, and diodes 201 and 203, to both ends of winding 179 of inductor 155. A suitable energizing unidirectional potential difference is applied between conductors 151 and 152. A conductor 204 is coupled to the mid-point of winding 179, and a resistor 205 is coupled between conductors 204 and 152. The remainder of the circuit for firing SCR 157 has been described in connection with FIGURE 3.

Inductor 155 is constructed to handle the volt-second integral of the energy applied over conductors 200, 202 without saturating until the frequency of the applied signal diminishes to a predetermined value. At this predetermined frequency inductor 155 is rapidly saturated and the square wave signal is developed across resistor 205, providing the requisite positive-going signal to gate on unijunction transistor 156, which in turn rapidly switches on SCR 157 to energize the winding of the associated relay 135, 136, or 137. After the SCR is switched on and the associated relay energized, a subsequent increase in the frequency of the signal applied over conductors 200, 202 above the critical operating frequency will not cause the SCR to cease conducting. Accordingly, the push button switch 206 is provided in series between SCR 157 and the relay winding to facilitate deenergization of the relay when desired.

*Summary*

From the foregoing explanation it is manifest that the control system of the present invention is particularly useful in a motor speed control arrangement including a plurality of motors controlled or driven between a given frequency or operating speed and a different frequency. That is, the system can regulate motor speed increase from zero to a preset low frequency, to facilitate "threading" or readying a system for operation, and then drive the motors up to the different frequency, representing the system operating speed. A somewhat simpler system can be utilized in which the system is always started at the thread-up speed and then driven up to the system speed without any frequency sensing, but only utilizing limit switches which are operated responsive to the physical position of the variable component which regulates the frequency of the oscillator timing pulses. Alternatively it may be desired to regulate the oscillator control circuit when the system is deenergized rather than when it is energized, for it is evident that the principles of the invention are applicable when the energized state of the system is changed either from off to on, or on to off. With the latter arrangement a decreasing frequency sensor is utilized to determine when the system speed has been decreased from the normal operating rate to the thread-up speed so that upon the subsequent energization of the system the motors will initially be operated at that speed most conducive to system start up. Thus the flexibility and positive operation of the system is apparent.

While only particular embodiments of the invention have been described and illustrated, it is manifest that various modifications and alterations may be made therein. It is therefore the intention in the appended claims to cover all such modifications and alterations as may fall within the true spirit and scope of the invention.

What is claimed is:

1. A control system for regulating the speeds of a plurality of electrical motors, comprising:
    a plurality of inverters selectively coupled to said motors for driving the associated motors at speeds related the frequencies of the output voltage from the inverters;
    a plurality of countdown means, respectively coupled to said inverters, for receiving a series of timing pulses, each countdown means providing a single output pulse responsive to receipt of a given number of input pulses;
    a variable frequency oscillator circuit for applying a series of timing pulses to all of said countdown means; and an oscillator control circuit including a motor connected to vary the frequency of the oscillator timing pulses from a given frequency to a predetermined different frequency as said motor is driven to provide a corresponding variation of the motor speeds as the energized state of the system is changed; and means, including a plurality of frequency sensors respectively coupled to said countdown means, for regulating the frequency variation of the oscillator timing pulses.

2. A control system as claimed in claim 1 in which said frequency sensors are connected for operation responsive to receipt of a signal of predetermined starting frequency, and drive the frequency of the oscillator timing pulses from the starting frequency to the system operating frequency.

3. A control system as claimed in claim 2 in which said frequency sensors are connected for operation responsive to receipt of a signal of predetermined starting frequency, and additional control means is operative to energize said motor and drive the frequency of the oscillator timing pulses from the starting frequency to the system operating frequency.

4. A control system as claimed in claim 1 in which said frequency sensors are connected for operation as said system is deenergized and the frequency of the oscillator timing pulses decreases to a predetermined starting frequency, thereby preparing the system for operation at said starting frequency responsive to subsequent energization of the system.

5. A control system for regulating the speeds of a plurality of electrical motors connected in different function channels, comprising:

at least one inverter in each function channel, connected to drive the motor in that same channel at a speed related to the frequency of the inverter output voltage;

a countdown unit in each function channel, coupled to the inverter in the same function channel for regulating the inverter operating frequency as a function of output pulses provided by the countdown unit in the same function channel, each countdown unit including adjustment means for presetting the number of timing pulses which must be received by the countdown unit before issuing a single output pulse to the associated inverter;

a frequency sensor unit in each of said function channels, and means for coupling said frequency sensor unit to the countdown unit in the same function channel to provide an operating signal from said frequency sensor unit responsive to receipt of a signal of preset frequency from an associated countdown unit;

a variable frequency oscillator circuit connected to apply a series of timing pulses to all of said countdown units; and an oscillator control circuit, connected to control a change in frequency of the oscillator timing pulses from a first frequency to a second frequency to provide a corresponding variation of the motor speeds in each function channel as the energized state of the system is changed.

6. A control system as claimed in claim 5 in which said frequency sensors are connected for operation responsive to a signal of increasing frequency to facilitate start-up of the system, actuation of the respective frequency sensors being effective to energize the inverters in all the function channels and prepare the system for operation from said start-up speed to the desired system operating speed.

7. A control system as claimed in claim 5 in which said frequency sensors are connected for operation responsive to a signal of decreasing frequency and specifically to operate responsive to receipt of a signal of given frequency related to the system start-up speed, thereby recognizing in the deenergization of the system the point at which the system operating speed has been reduced to the system start-up speed.

References Cited

UNITED STATES PATENTS

| | | | |
|---|---|---|---|
| 2,784,365 | 3/1957 | Fenemore et al. | 318—231 XR |
| 3,178,624 | 4/1965 | Borden | 318—231 XR |
| 3,317,805 | 5/1967 | Kay et al. | 318—231 |
| 3,343,063 | 9/1967 | Keeney et al. | 318—231 XR |
| 3,344,326 | 9/1967 | Risberg | 318—231 XR |

ORIS L. RADER, *Primary Examiner.*

G. RUBINSON, *Assistant Examiner.*

U.S. Cl. X.R.

318—227, 231, 415, 416